United States Patent [19]
Ernst

[11] 3,760,487
[45] Sept. 25, 1973

[54] METHOD AND APPARATUS FOR PRODUCING SHEAR PINS FOR USE IN A HARDNESS TESTING APPARATUS

[76] Inventor: Alfred Ernst, Via del Cairo 37, Varese, Italy

[22] Filed: June 7, 1971

[21] Appl. No.: 150,674

[30] Foreign Application Priority Data
June 9, 1970 Italy.............................. 25710 A/70
Apr. 10, 1971 Italy.............................. 23017 A/71

[52] U.S. Cl. .................................. 29/407, 29/417
[51] Int. Cl. ..................... B23d 15/14, B23q 15/00
[58] Field of Search ......................... 73/78, 81–85, 73/94, 101; 64/28; 29/407, 417

[56] References Cited
UNITED STATES PATENTS
1,618,001  2/1927  Gauthier................................ 73/94
2,437,750  3/1948  Mann.................................... 73/101
3,150,523  9/1964  Papsis.................................... 73/101
3,397,453  8/1968  Gwyn.................................... 29/417
3,643,499  2/1972  Thayer.................................. 73/101

FOREIGN PATENTS OR APPLICATIONS
341,512  10/1921  Germany............................... 73/85

Primary Examiner—James J. Gill
Attorney—Michael S. Striker

[57] ABSTRACT

A method and apparatus for producing shear pins for use in a hardness testing apparatus according to which the shear pins are sheared off from an elongated bar substantially under the same condition as they are sheared in the testing apparatus, while the force necessary for shearing off the pins from the bar is measured.

5 Claims, 3 Drawing Figures

METHOD AND APPARATUS FOR PRODUCING SHEAR PINS FOR USE IN A HARDNESS TESTING APPARATUS

This invention relates to durometers for measuring the hardness of materials and a method of using such durometers.

It is customary for the hardness of a material to be found by impression tests. In these tests a hardened steel ball (Brinell test) or a diamond point (Vickers test), for example, are pressed into the material to be tested under a measured force. The width, and thus depth, of the impression formed is determined and the hardness is expressed in terms of a hardness number which depends on the depth of the impression.

It has been proposed to provide durometers in which an external member, to which an uncontrolled external force is applied, is connected to a stem supporting a penetrating tip by an element which breaks when a predetermined force is applied. Thus a controlled force can be applied to the tip. In this proposed durometer the breaking element was a wire. This durometer, however, had disadvantages preventing accurate measurements of the hardness. One disadvantage is that the wires, intended to break during the operation of the durometer, are usually cut from a continuously formed wire and their shear properties are seldom constant and are often found to be well outside required tolerance limits at various locations along the wire length.

The variations in the breaking force can result from very small variations in section which are within normal manufacturing tolerance limits in the formation of the wire, or from variations in temperature during the treatment of the wire, which can occur for example in the course of a wire drawing operation.

When the breaking force is outside required tolerance limits, it does not permit an accurate measurement of hardness. Preferred tolerance limits are within ± 1 percent.

Another disadvantage is that this proposed durometer has to be held in one hand, while the other hand is used to apply an external force, for instance using a hammer. For this reason the tip is seldom disposed perpendicular to the surface of which the hardness is to be measured. As a consequence, the penetrating tip produces an irregular impression on the surfaces.

According to the present invention we provide a method of testing the hardness of a material in which a shearable control bar is used, comprising adjusting the bar dimensions thereby adjusting to within tolerance limits the force required to shear the bar, impressing a penetrating tip into a surface of the material to be tested with a predetermined force which is dependent on the force required to shear the control bar, the force being transmitted to the tip via the bar until the bar shears, and measuring the resulting impression in the material.

The length of the control bar is preferably less than twice the length between two spaced locations at which the bar is simultaneously sheared.

Also according to the invention we provide a combination of a durometer comprising a penetrating tip, a support constructed to transmit force to the tip, and a shearing member to apply force to the support via a control bar which is dimensioned to shear when a predetermined force is applied to the bar by the shearing member and which is supported by the support, and a device for controlling the predetermined force to within specified tolerance limits. Each control bar is obtained from a length of drawn or other material by shearing and the force required for shearing each control bar is simultaneously measured.

The control bars which require a shear breaking force within required tolerance limits are immediately reserved for use in the durometer, other sheared bars which require a shear force higher than the maximum permitted force are reduced in cross-section to reduce the force to within the required tolerance limits, and bars which require a shear force lower than the minimum permitted force are discarded.

The shearing operation for the control bars is preferably made under the same shear stress conditions under which the bars are to be used within the durometer.

To obtain a more accurate control, an elongated bar of a length equal to double the required length of each control bars plus a length equal to the distance between two spaced shearing locations are sheared centrally at two spaced locations and the force required for shearing each control bar is thus determined. Unsuitable Bars are again discarded.

As the shearing operations to select suitable control bars are carried out on sections of bars of greater length in very close proximity to the control bars, the shear force required to shear the control bars can be determined fairly accurately.

A preferred and illustrative embodiment of the invention will now be particularly described with reference to the accompanying drawing, in which.

Figure 1:
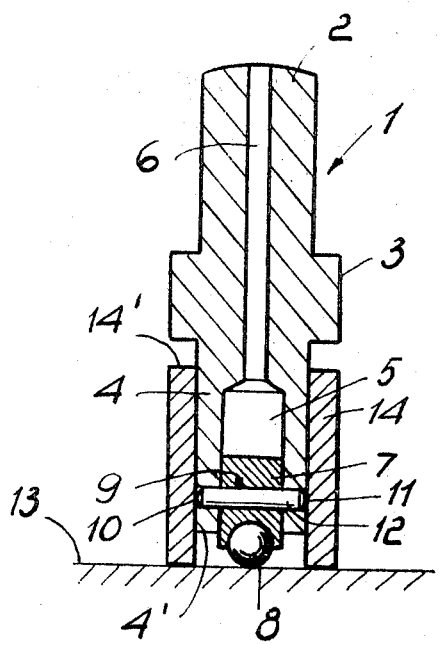
FIG. 1 is an axial sectional view showing a durometer before an external force has been applied.
Figure 2:
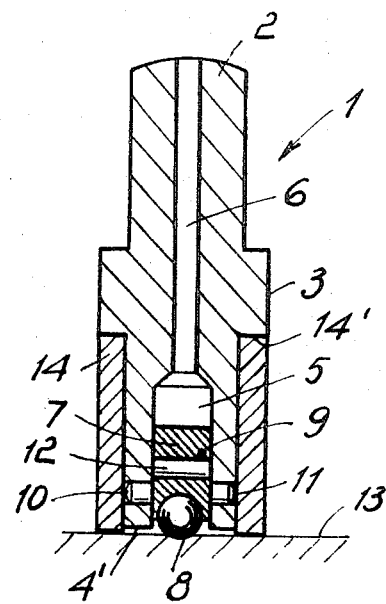
FIG. 2 is an axial sectional view showing the durometer of FIG. 1, after an external force has been applied.

Referring to FIGS. 1 and 2, the durometer comprises a shearing member 1 having a head 2 to which an impact or static external force can be applied, an annular shoulder 3, and a hollow lower portion 4. The portion 4 includes a hole 5 in which a support 7 is seated. The hole 5 is open to atmosphere through passage 6. The support 7 seats a penetrating tip in the form of a ball 8 and includes a hole 9 in which a control bar 12 is supported. The portion 4 of shearing member 1 has two opposed holes 10 and 11 each with the same diameter as the hole 9 and coaxially aligned therewith, and into which the bar 12 extends.

The bar 12 is preferably formed of steel.

The ball 8 extends well below the lower edge of the member 1.

A sleeve 14 encircles the lower portion 4 of the shearing member 1, and serves as a guide for the member. Thus, when the durometer is in its operating position on surface 14, as shown in FIG. 1, the lower edge of the sleeve rests against the surface 13 and permits the member 1 to slide downwardly within the sleeve bore until the tip 8 rests against the surface. In this position, the axes of the member 1 and of the support 7 are perpendicular to the surface 13. Upper edge 14' of the sleeve 14 is spaced from the annular shoulder 3, the spacing being less than the distance between lower edge 4' of the member 1 and the surface 13.

When an external impact or static force is applied to the head 2, the force is transmitted via the control bar 12 to the support 7. The bar 12 is subjected to shear stress at the locations between the holes 10 and 11 and the hole 9 and, when sufficient force is applied, is sheared at these locations. The sheared bar is shown in FIG. 2.

Thus, the support 7 and the ball 8 are subjected to a predetermined force (within required tolerance limits). The impressing force on the ball 8 is therefore known and this permits an accurate measurement of the hardness of the surface 13. The limits of tolerance depend only on the control bar 13.

Figure 3:
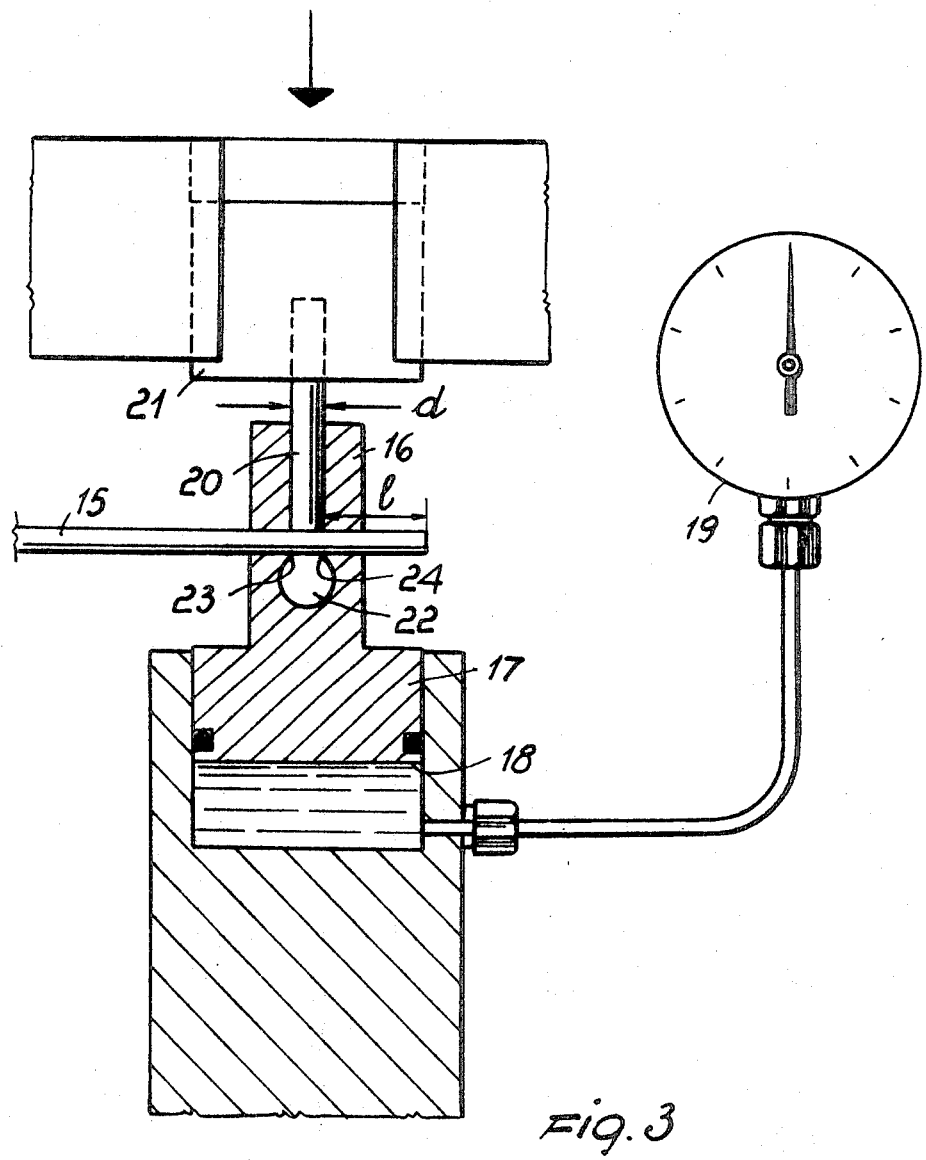
FIG. 3 is a schematic view of a device which facilitates the production of control bars.

The device illustrated in FIG. 3 allows the shear force of the control bars to be accurately determined.

In FIG. 3, an elongated bar 15 of circular cross-section from which control bars are to be cut is fed into a gauged diametral hole of a support portion 16 of a plunger 17. The plunger 17 is free to slide within a cylinder 18 containing a fluid. The bar can be drawn or otherwise formed, and is preferably steel.

The cylinder 18 is connected to a measuring instrument 19, in this case a pressure gauge, to measure the pressure of the fluid. The gauge 19 can be rated to give direct readings of forces applied to the plunger 17.

The support portion 16 has a vertical hole into which a punch 20, connected to driver 21 in a keyed guide, can slide. The driver is constrained to impart an axial force to the punch 20. The punch 20 rests on the elongated bar 15, and can thus transmit to the bar 15 any force applied to, and the weight of, the driver 21.

Under the vertical punch hole and the gauged hole for bar 15 and mutually at right angles to these holes is a channel 22, which opens at the top into the gauged hole through which the bar 15 can pass. The bar 15 rests above two edges 23 and 24 of the channel 22, the distance between the edges being equal to or fractionally larger than the diameter $d$ of the punch 20. In order to obtain a small bar of length L, the length between the edge of 24 and the free end of the bar 15 is measured.

When the bar 15 is suitable positioned, a force is applied to the driver 21 so that the punch 20 shears the bar 15 along the locations close to the edges 23 and 24 of the channel 22. The force which effects the shearing is transmitted to the supporting means 16 and the plunger 17 and thus to the fluid contained in the cylinder 18, whereby the pressure of the latter increases and is indicated on gauge 19. The pieces severed from between the edges 23 and 24 falls into the channel 22 and is ejected, while the control bar obtained is removed.

The diameter of the punch 20 is preferably equal to the diameter of the support 7 shown in FIGS. 1 and 2, and therefore the shearing is made under the same conditions as the shearing in the durometer.

After the measurement of the force which sheared control bars from the bar 15 is obtained, the control bars which required a shearing force within the required tolerance limits are reserved for use in the durometer.

Any sheared bars which required a shearing force higher than the maximum required force are reduced in cross-section and re-tested. The reduction in cross-section of the sheared bars is carried out as a precision operations, for example, by grinding, since the thickness of material to be removed is usually very small, and may be within a range of a tenth to a hundredth of a milimeter. Sheared bars which required a shear force less than the minimum permissible force are discarded. According to a preferred embodiment of the invention, the drawn piece 15 is cut by shearing into pieces of a length double the length L plus the diameter of the punch 20, i.e. $2L + d$. If the shearing force is within the tolerated limits, the piece is again sheared to obtain two bars of length L. The shear force is again measured for checking purpose.

If on the first shearing, the shear force is above the maximum permissible force, the piece is reduced in cross-section, after which it is divided into two bars of length L. The shear force is measured to check that the required limits of tolerance are attained.

If the shearing force for the bar on the first shearing is less than the minimum permissible, the bar is discarded.

From the above it can be seen, that the shear force obtained by the use of the device illustrated in FIG. 3, is measured very close to the shearing locations of the control bars used in the durometer. Thus, the shearing force in the durometer is generally equal to the force at which the bar is sheared in the device of FIG. 3.

The operations described regarding the feeding of the bar 15, lowering of the punch 20 for shearing, selection of control bars, etc. can be made automatically.

What I claim is:

1. A method of producing shear pins of predetermined length for use in a hardness testing apparatus in which a predetermined force to be applied to a member penetrating into the material to be tested is determined by the force required to shear such a shear pin at two spaced cross sections, said method comprising the steps of producing an elongated member of a cross section having a shear strength substantially equal to said predetermined force; shearing from said elongated member a pin of a length at least equal to said predetermined length while at the same time measuring the force required to shear the elongated member; discarding the thus obtained sheared-off pin when the force measured is substantially smaller than the predetermined force; reducing the cross section of said elongated member when the measured force is greater than said predetermined force; and reserving the sheared-off pin for use in a hardness testing apparatus when the measured force is substantially equal to said predetermined force.

2. A method as defined in claim 1, wherein the sheared-off pin is reserved when the measured force is equal to said predetermined force ± 1 percent.

3. A method as defined in claim 1, wherein said elongated member has a circular cross section.

4. A method as defined in claim 3, wherein a pin greater than twice said predetermined length is first sheared off from said elongated member, whereafter a portion of the thus obtained pin is sheared therefrom between the opposite ends thereof to obtain two sheared pins of said predetermined length.

5. A method as defined in claim 4, wherein the length of the first sheared-off pin is equal to twice said predetermined length plus the distance between said spaced cross sections.

* * * * *